US006550720B2

(12) United States Patent
Fleeter et al.

(10) Patent No.: US 6,550,720 B2
(45) Date of Patent: *Apr. 22, 2003

(54) AEROBRAKING ORBIT TRANSFER VEHICLE

(75) Inventors: Richard Fleeter, Reston, VA (US);
Daniel B. DeBra, Los Altos, CA (US);
Paul Gloyer, Waveland, MS (US);
Zeno Wahl, Leesburg, VA (US); David Goldstein, Roslindale, MA (US)

(73) Assignee: AeroAstro

(*) Notice: Subject to any disclaimer, the term of this patent is extended or adjusted under 35 U.S.C. 154(b) by 0 days.

This patent is subject to a terminal disclaimer.

(21) Appl. No.: 09/925,207

(22) Filed: Aug. 9, 2001

(65) Prior Publication Data

US 2002/0190160 A1 Dec. 19, 2002

Related U.S. Application Data

(63) Continuation-in-part of application No. 09/350,813, filed on Jul. 9, 1999, now Pat. No. 6,286,787.

(51) Int. Cl.[7] .................................................. B64G 1/22
(52) U.S. Cl. ............................. 244/158 R; 244/110 D
(58) Field of Search ......................... 244/160, 158 R, 244/113, 172, 169, 164, 173, 110 D (56) References Cited

U.S. PATENT DOCUMENTS

| | | | | |
|---|---|---|---|---|
| 4,754,601 A | * | 7/1988 | Minovitch | |
| 4,817,895 A | * | 4/1989 | Scott et al. | |
| 4,896,847 A | * | 1/1990 | Gertsch | |
| 4,903,918 A | * | 2/1990 | Park et al. | |
| 5,080,306 A | * | 1/1992 | Porter et al. | |
| 5,626,315 A | * | 5/1997 | Flament et al. | |
| 6,147,294 A | * | 11/2000 | Dailey et al. | |
| 6,227,497 B1 | * | 5/2001 | Draim | |

* cited by examiner

Primary Examiner—Tien Dinh
(74) Attorney, Agent, or Firm—Robert M. McDermott, Esq.

(57) ABSTRACT

The excess space and weight capacity that is typical of a launch of large satellites to high-energy orbits, such as a geosynchronous orbit, is used to deploy small satellites at a substantially lower-energy orbit, such as a low-earth orbit. An orbit-transfer vehicle provides the navigation, propulsion, and control systems required to transport a payload satellite from a geosynchronous-transfer orbit (GTO) to a predetermined low-earth orbit (LEO). Depending upon the particular configuration, upon achieving the low-earth orbit, the orbit transfer vehicle either releases the payload satellite, or remains attached to the payload satellite to provide support services, such as power, communications, and navigation, to the payload satellite. To reduce the fuel requirements for this deployment via the orbit-transfer vehicle, the orbit-transfer vehicle employs aerobraking to bring the satellite into a low-earth orbit. The aerobraking is preferably performed at a nominal altitude of 150 km above the earth, where the atmosphere is dense enough to allow for a reasonably sized drogue device, yet rare enough to avoid the need for special purpose heat-shielding materials. In a preferred operation, the provider of the orbit-transfer vehicle identifies and secures available excess capacity on geosynchronous-transfer launch vehicles, and allocates the excess capacity to the satellites requiring low-earth orbit deployment, thereby providing a deployment means that is virtually transparent to the purchaser of this deployment service.

34 Claims, 4 Drawing Sheets

AEROBRAKING ORBIT TRANSFER VEHICLE

CROSS REFERENCE TO RELATED APPLICATIONS

This is a Continuation-In-Part of U.S. patent application Ser. No. 09/350,813, filed Jul. 9, 1999, now U.S. Pat. No. 6,286,787, issued Sep. 11, 2001 to Richard Fleeter.

BACKGROUND OF THE INVENTION

1. Field of the Invention

This invention relates to the field of aerospace, and generally to the deployment of small satellites from high-energy orbits to lower-energy orbits, via aerobraking.

2. Description of Related Art

Satellites, because of their unobstructed fields of view of large areas of the earth, are often the preferred technical solutions to a variety of communications and monitoring problems as well as space and earth science applications. The high cost of satellite deployment, however, often precludes their use from a cost-efficiency viewpoint. In order to distribute the high costs of deployment among a large number of applications or users, the majority of deployed satellites are those that handle a multitude of tasks, or a multitude of customers for the same task. To minimize the loss of available access time to or from the satellite from or to the location on earth being serviced by a satellite, many satellites are placed in geosynchronous orbit. A geosynchronous orbit tracks the revolution of the earth, so that the satellite appears to be fixed over the same area of the earth, thus providing continual access to that area. Due to the physics involved, a geosynchronous orbit is approximately 36,000 kilometers above the earth. To provide reliable communications over this long distance, a geosynchronous satellite requires highly sensitive receivers and/or highly powerful transmitters. Because of the aforementioned economic and technical requirements, geosynchronous satellites generally weigh a ton or more, and cost (in 1999) hundreds of millions of dollars to deploy to the selected geosynchronous orbit.

As contrast to large geosynchronous satellites, the use of small satellites at low-earth orbit (LEO) are becoming increasingly common. U.S. Pat. No. 6,128,469, "SATELLITE COMMUNICATION SYSTEM WITH A SWEEPING HIGH-GAIN ANTENNA", issued Oct. 3, 2000 to Fleeter et al.; U.S. Pat. No. 6,396,819, "LOW-COST SATELLITE COMMUNICATION SYSTEM", issued May 28, 2002 to Fleeter et al.; U.S. Pat. No. 6,317,029, "IN SITU REMOTE SENSING", issued Nov. 13, 2001 to Richard Fleeter; and U.S. Pat. No. 6,296,205, "RF INSPECTION SATELLITE", issued Oct. 2, 2001 to Hanson et at. illustrate the use of low cost satellites for a variety of applications, and are incorporated by reference herein. Low-earth orbits arc typically hundreds of miles above the earth, rather than thousands of miles. Because of their order of magnitude closer proximity to earth, satellites in low-earth orbit require significantly less communicating and monitoring power and sensitivity than the satellites in geosynchronous orbit. Because they are not stationary above any location on the earth, multiple satellites in low-earth orbit are required to provide continuous coverage of a particular area on earth. Because multiple satellites are required in low-earth orbit to provide continuous coverage, a low-earth orbit satellite system is particularly well suited to applications that employ low cost satellites. As advances continue to be made in electronic circuit density and efficiency, the number of communication and monitoring applications that can be embodied in small, low cost satellites continues to increase.

Deployment of a small, less than five hundred pound, satellite into low-earth orbit typically costs, in 1999 dollars, between ten and twenty-five million dollars. Because a plurality of satellites is required to provide continuous coverage of an area, the overall cost of deploying constellations of low-earth orbit satellites can often amount to hundreds of millions of dollars.

BRIEF SUMMARY OF THE INVENTION

It is an object of this invention to provide a lower cost means for deploying a satellite into low-earth orbit. It is a further object of this invention to provide a method for economically brokering the deployment of a satellite into low-earth orbit. It is a further object of this invention to provide an orbit-transfer vehicle to effectively deploy small satellite systems to low-earth orbit.

A launch of geosynchronous satellites typically includes one or two large, multi-ton, satellites that are deployed at the geosynchronous altitude of 36,000 kilometers via a large multi-stage rocket system, such as an Ariane system. Typically, after allocating the available space and weight capabilities of the rocket system to the primary payload of the one or two large satellites, some excess space and weight allocation remains. For example, if an Ariane launch vehicle can accommodate four tons, and the primary payload satellites are 1.5 and 2 tons each, the launch vehicle has an excess capacity of a half ton. Because the marginal cost of adding one or two small satellites is minimal, this excess space or weight capacity can be brokered for the deployment of small satellites at substantially less cost than the primary payload, often less than a quarter of the cost per pound charged to the primary payload satellites.

The expressed objects of this invention, and others, are achieved by providing a means of utilizing the excess space and weight capacity that is typical of a launch of large satellites to high-energy orbits, such as a geosynchronous orbit, to deploy small satellites at a substantially lower-energy orbit, such as a low-earth orbit. In a preferred embodiment, an orbit-transfer vehicle provides the navigation, propulsion, and control systems required to transport a payload satellite from a geosynchronous-transfer orbit (GTO) to a predetermined low-earth orbit (LEO). Depending upon the particular configuration, upon achieving the low-earth orbit, the orbit transfer vehicle either releases the payload satellite, or remains attached to the payload satellite to provide support services, such as power, communications, and navigation, to the payload satellite. To reduce the fuel requirements for this deployment via the orbit-transfer vehicle, a preferred embodiment includes aerobraking to bring the satellite into a low-earth orbit. The aerobraking is preferably performed at a nominal altitude of 150 km above the earth, where the atmosphere is dense enough to allow for a reasonably sized drogue device, yet rare enough to avoid the need for special purpose heat-shielding materials. In a preferred embodiment of this method of deployment, the provider of the orbit-transfer vehicle identifies and secures available excess capacity on geosynchronous-transfer launch vehicles, and allocates the excess capacity to the satellites requiring low-earth orbit deployment, thereby providing a deployment means that is virtually transparent to the purchaser of this deployment service.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
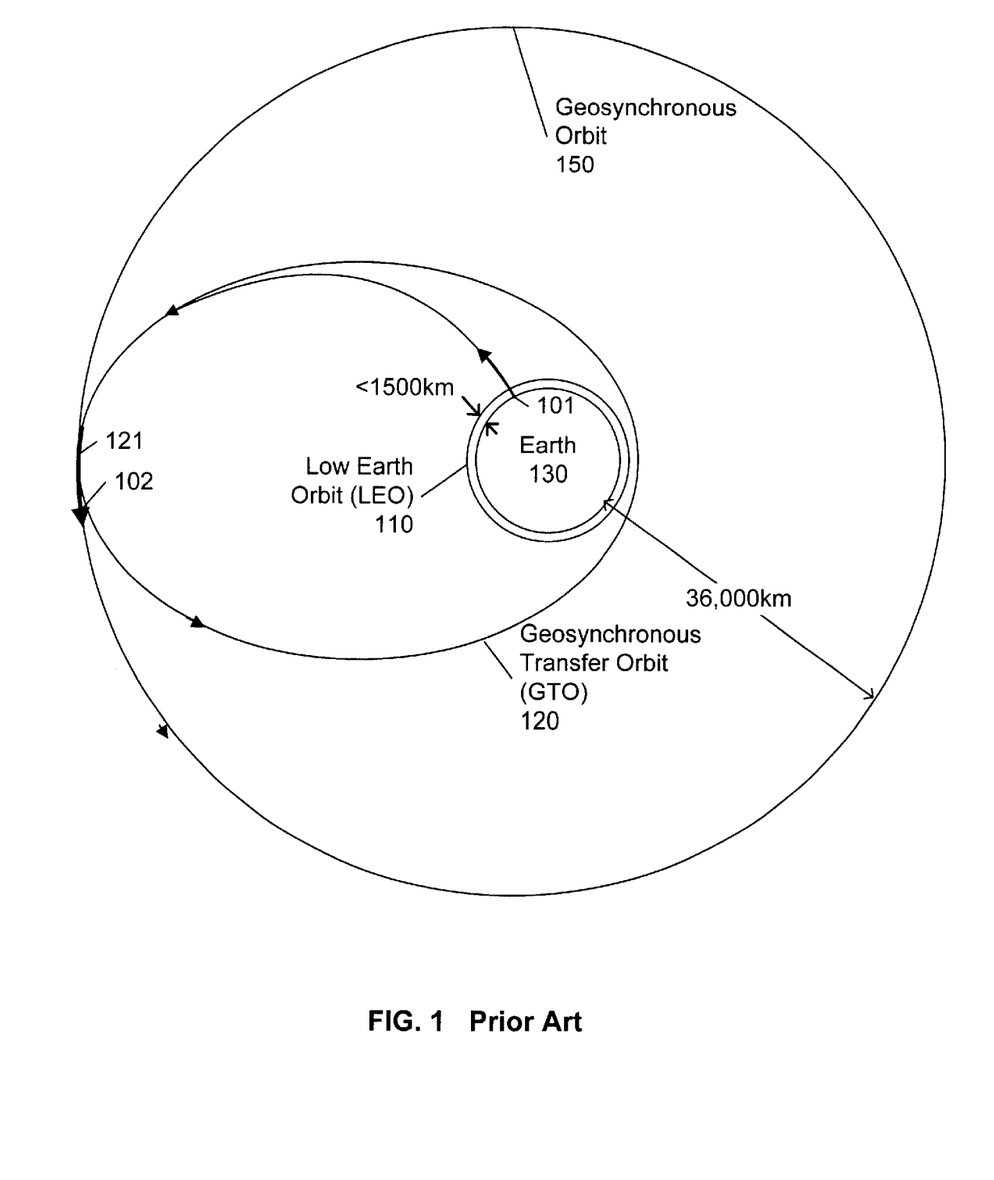
FIG. 1 illustrates a conventional deployment of a geosynchronous satellite via a geosynchronous-transfer (GTO) launch vehicle.

FIG. 1 illustrates a conventional deployment of a geosynchronous satellite via a geosynchronous-transfer launch vehicle. Note that the figures are presented herein for illustration purposes. Although the relative size of the illustrated orbits are approximately to scale relative to the illustrated size of the earth 130, the specific details of the orbits should not be interpreted as being representative. A geosynchronous-transfer launch vehicle (not shown) containing one or more satellites for deployment in geosynchronous orbit 150 is launched 101 from the earth 130. The geosynchronous-transfer launch vehicle is configured to achieve a geosynchronous-transfer orbit (GTO) 120 whose apogee 121 is tangent to the geosynchronous orbit 150. Some time after achieving the geosynchronous-transfer orbit 120, the one or more geosynchronous satellites (not shown) are released from the geosynchronous-transfer launch vehicle. All items that are released by the geosynchronous-transfer launch vehicle have the same velocity as the geosynchronous-transfer launch vehicle when they are released, and therefore continue to travel in the geosynchronous-transfer orbit 120. Each geosynchronous satellite contains a means for applying thrust 102, preferably at or near apogee 121, to enter an intended tangential geosynchronous orbit 150.

Figure 2:
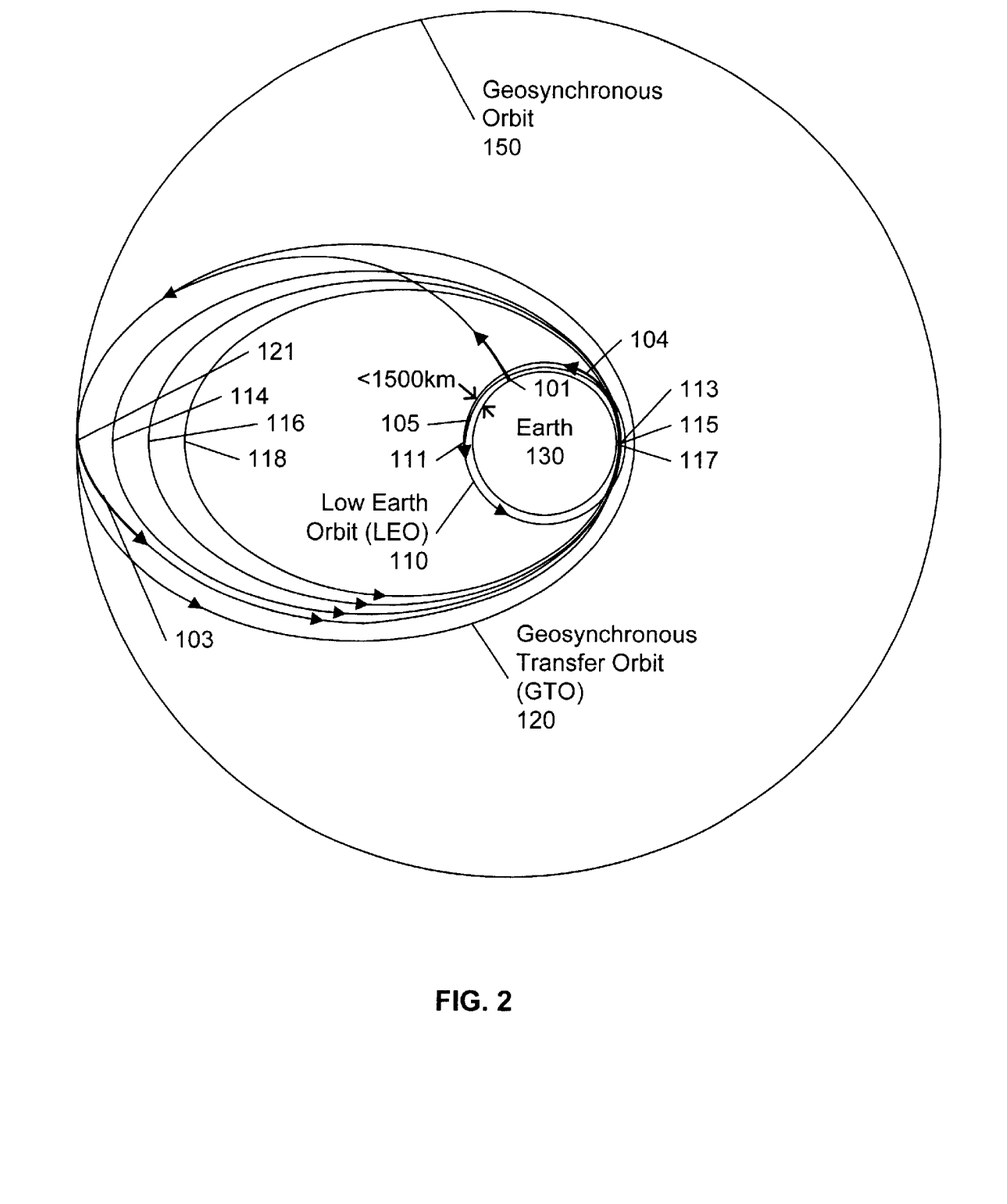
FIG. 2 illustrates an example deployment of a low-earth orbit (LEO) satellite using a geosynchronous-transfer (GTO) launch vehicle in accordance with this invention.

FIG. 2 illustrates an example method of deploying a low-earth orbit (LEO) satellite using a geosynchronous-transfer launch vehicle in accordance with this invention. As noted above, a geosynchronous orbit 150 is located 36,000 kilometers above the earth 130. A low-earth orbit 110, on the other hand, is located well within 1500 kilometers of the earth 130. The Space Shuttle, for example, typically orbits the earth at an altitude between 160 and 600 kilometers. For ease of reference, the term geosynchronous-transfer launch vehicle is used to define a launch vehicle that deploys its payload at an elevation above the earth that is substantially higher than a low-earth orbit, i.e. at a higher-energy orbit than the target lower-energy orbit, because the most common use of a high-altitude launch vehicle is for geosynchronous satellite deployment. As will be evident to one of ordinary skill in the art, this invention is applicable for any higher-energy to lower-energy orbit transfer and is not limited to a GTO to LEO transfer.

In accordance with this invention, an orbit-transfer vehicle (not shown) containing the low-earth orbit satellite (not shown) is launched 101 from the earth 130 via a conventional geosynchronous-transfer launch vehicle (not shown), such as an Ariane. The geosynchronous-transfer launch vehicle releases the orbit-transfer vehicle into geosynchronous-transfer orbit 120. Some time after release, preferably at the apogee 121 of the geosynchronous-transfer orbit 120, the orbit-transfer vehicle fires 103 its integral propulsion device (not shown) to force itself, and the attached low-earth orbit satellite, out of the geosynchronous-transfer orbit 120, and begins a forced descent toward the earth 130. Another firing 104 of the propulsion device can thereafter be used to place the orbit-transfer vehicle directly into a low-earth orbit 110, but such a direct geosynchronous-transfer orbit to low-earth orbit transfer will require a substantial amount of fuel to reduce the kinetic energy of the orbit-transfer vehicle sufficiently to remain in the low-earth orbit 110.

In accordance with an aspect of this invention, aerobraking is used to facilitate the transfer from the higher-energy geosynchronous-transfer orbit to the lower-energy low-earth orbit. Aerobraking uses the friction of the earth's atmosphere to reduce the kinetic energy of a spacecraft, and is viable for altitudes between 80 and 600 kilometers above the earth, by providing an aerobrake (drogue) device that is configured to provide an appropriate amount of friction with the atmosphere.

Illustrated in FIG. 2, the firing 103 of the propulsion device provides a thrust to force the orbit-transfer vehicle close to the earth 130, at 113. In a preferred embodiment, discussed further below, the firing 103 of the propulsion device is controlled to provide a perigee 113 of approximately 150 kilometers above the earth 130. At this nominal 150 km altitude, the atmosphere of the earth is sufficiently dense so as to impart a frictional force on the aerobrake device that reduces the kinetic energy of the orbit-transfer vehicle, and its attached low-earth orbit satellite. This reduction in kinetic energy results in an apogee 114 of the orbit-transfer vehicle that is less than its original geosynchronous-transfer orbit apogee 121. Upon achieving apogee 114, the orbit-transfer vehicle is drawn toward the earth 130 again, and reaches perigee 115, also approximately 150 km above the earth 130. The friction of the earth's atmosphere at this low altitude again reduces the kinetic energy of the orbit-transfer vehicle, and the resultant apogee 116 is less than the prior apogee 114. Subsequent traversals 117 of the earth's atmosphere will continue to reduce the kinetic energy of the orbit-transfer vehicle, further lowering each subsequent apogee 118.

When sufficient kinetic energy is removed from the orbit-transfer vehicle, the decreasing apogee 111 of the orbit-transfer vehicle substantially approaches the altitude of the intended low-earth orbit 110. At this apogee 111, the orbit-transfer vehicle effects the firing 105 of the integral propulsion device to force an ascent of the orbit-transfer vehicle so as to raise the perigee of the orbit-transfer vehicle, and attached low-earth orbit satellite, beyond the earth's atmosphere, thereby preventing further decreases of apogee. The preferred firing 105 places the orbit transfer vehicle, and attached low-earth orbit satellite, into a symmetric low-earth orbit 110, with a perigee that is substantially equal to the apogee 111. In a preferred embodiment, over one hundred aerobraking orbits are made before firing the integral propulsion device at 105. Typically, the orbit-transfer vehicle releases the low-earth orbit satellite at this low-earth orbit 110, and thereafter the low-earth orbit satellite operates independently, as it would have, had it been launched directly from the earth 130 to the low-earth orbit 110. That is, although the low-earth orbit satellite may travel hundreds of thousands of miles to reach an orbit 110 that is only a few hundred miles above the earth's surface, its operation is substantially independent of this rather circuitous deployment scheme. Optionally, the orbit-transfer vehicle is configured to provide services, such as power, communications, navigation, and so on, and remains with the payload satellite to continue to provide these services after the satellite is deployed.

Figure 3:
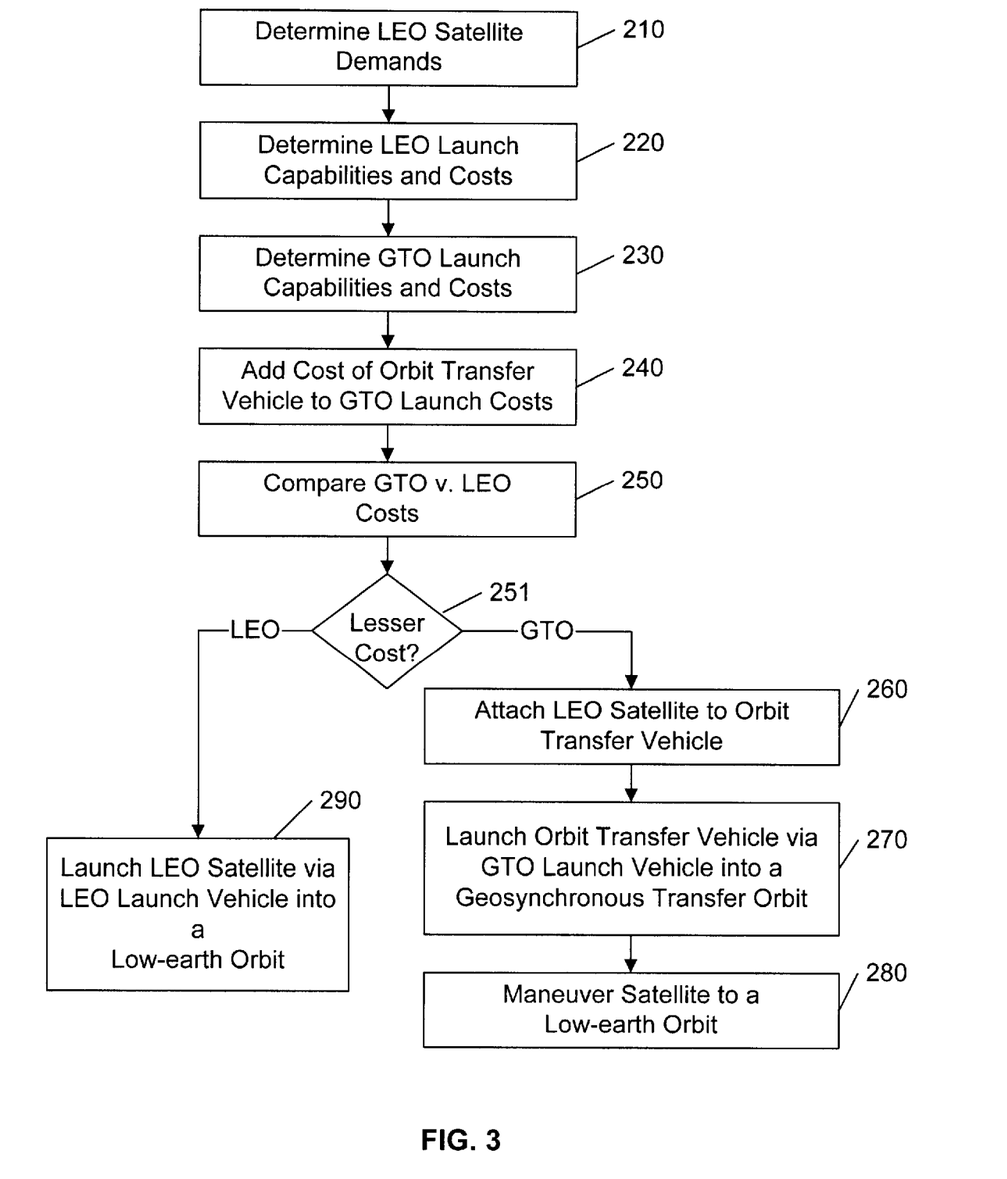
FIG. 3 illustrates an example method of facilitating the use of excess capacity of a geosynchronous-transfer launch vehicle for deploying a low-earth orbit satellite in accordance with this invention.

Because the deployment methods in accordance with this invention can be effected without affecting the satellite payload, this invention provides a means for brokering lower cost services for the deployment of low-earth orbit satellites. Generally, a satellite is used as a component of a ground-based system, such as a communications network, a research facility, and the like. The user, or owner, of the satellite is not necessarily fluent in the intricacies of rocketry and orbital mechanics. A satellite deployment broker provides the interface services and support between the owner of the satellite and the provider of a launch vehicle. In accordance with the principles of this invention, a satellite deployment broker can extend the range of potential low-earth orbit satellite launch vehicle providers to include geosynchronous-transfer launch vehicle providers having excess capacity. FIG. 3 illustrates, for example, a flow diagram for allocating launch services for low-earth orbit satellite deployments. At 210, the satellite(s) requirements are determined, including the required orbit parameters, the size and weight of the satellite, and so on. At 220, the cost of a conventional low-earth orbit launch that satisfies the requirements are determined or estimated. At 230, the availability of excess capacity on scheduled geosynchronous orbit launch vehicles is determined, and a cost is negotiated for using this excess capacity. The overall cost of deploying the low-earth orbit satellite via a geosynchronous-transfer launch is the cost of using the excess launch capacity of the geosynchronous-transfer launch vehicle plus the cost of the orbit-transfer vehicle for transporting the satellite from the geosynchronous orbit to the low-earth orbit, as determined at 240. If, at 250–251, the overall cost of the geosynchronous-transfer launch and orbit-transfer is less than the conventional low-earth orbit launch, the deployment is effected by attaching 260 the satellite to the orbit-transfer vehicle and launching 270 the orbit-transfer vehicle with satellite via the geosynchronous-transfer launch vehicle. Thereafter, the orbit-transfer vehicle effects the deployment 280 of the satellite to a low-earth orbit as discussed above. If, at 250, the cost of the conventional low-earth orbit launch is less expensive than the geosynchronous-transfer launch, the satellite is deployed 290 via the conventional low-earth orbit launch. Note that a deployment of a constellation of satellites to low-earth orbits in accordance with this invention can involve a combination of low-earth orbit and geosynchronous-transfer launches, depending primarily on the availability and cost of excess capacity on scheduled geosynchronous-transfer launch vehicles.

Figure 4:
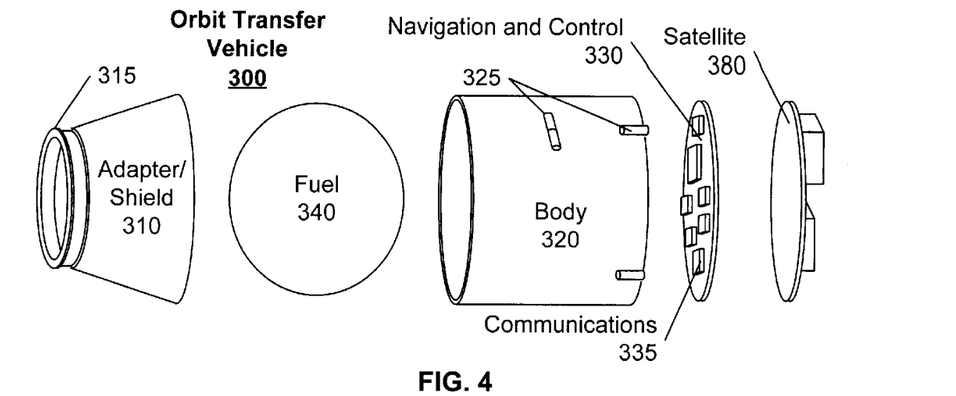
FIG. 4 illustrates an example orbit-transfer vehicle in accordance with this invention.

FIG. 4 illustrates an example orbit-transfer vehicle 300 in accordance with this invention. The example orbit-transfer vehicle 300 includes an adapter element 310 that provides a conventional means 315 for securing the vehicle 300 to the geosynchronous-transfer launch vehicle (not shown), a body element 320 that provides a cavity for holding a fuel tank 340, and a guidance and navigation system 330 that provides the navigation, power, and control systems required to transport the satellite from a geosynchronous-transfer orbit to a predetermined low-earth orbit. The orbit-transfer vehicle 300 also includes a communications system 335 for receiving commands from a ground station, and for communicating status information to the ground station. As noted above, depending upon the particular application, the navigation and control system 330 and communications system 335 may remain with the satellite 380 after the satellite 380 is deployed, to provide these functions for controlling and communicating with the satellite 380.

The adapter element 310 and body 320 in a preferred embodiment include shielding to enable the orbit-transfer vehicle 300 to withstand the heat that is induced by the atmospheric friction during aerobraking. The elevation at perigee 113, 115, 117 determines the required degree of shielding. Correspondingly, the elevation at perigee 113, 115, 117 determines the number of aerobraking orbits required to provide a sufficient reduction in the kinetic energy of the orbit-transfer vehicle 300 to achieve a low-earth orbit, given the capacity of the fuel tank 340, and the effectiveness of any aerobraking devices, discussed below with regard to FIGS. 6 and 7. Thrusters (not shown) effect the thrust required to effect the orbit-transfer, under the control of the guidance and navigation system 330. In this embodiment, the payload satellite 380 is designed to be mounted within the body 320, and is released from the orbit-transfer vehicle 300 when the appropriate low-earth orbit is achieved.

Figure 5:
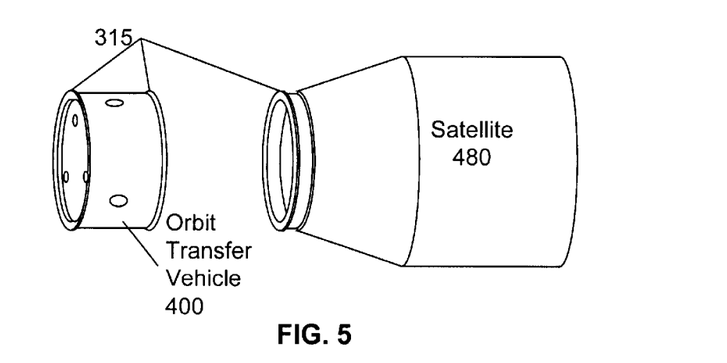
FIG. 5 illustrates an alternative example orbit-transfer vehicle in accordance with this invention.

Alternative arrangements will be evident to one of ordinary skill in the art in view of this disclosure. For example, FIG. 5 illustrates an orbit-transfer vehicle 400 for use with a satellite 480 having an integral body with conventional means 315 for securing the satellite 480 to a launch vehicle (not shown). U.S. Pat. No. 6,227,493 "REUSABLE, SEPARABLE, STRUCTURAL CONNECTOR ASSEMBLY", issued May 8, 2001 to Walter Holemans, and incorporated by reference herein, discloses a light-weight coupling device ("Lightband") that is particularly well suited for this application. In this embodiment, the orbit-transfer vehicle 400 is configured to provide a corresponding coupling to the satellite 480 and the launch vehicle, allowing satellites 480 that are designed for a conventional low-earth orbit launch to use this invention, without modification.

Figure 6:
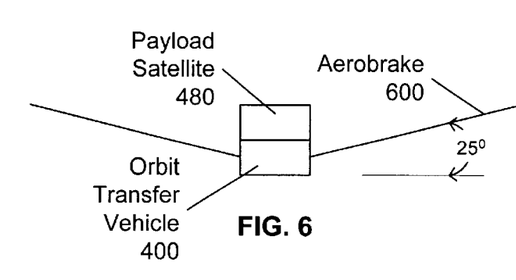
FIGS. 6 and 7 illustrate an example aerobrake device for reducing the kinetic energy of an orbit-transfer vehicle in accordance with this invention.
Figure 7:
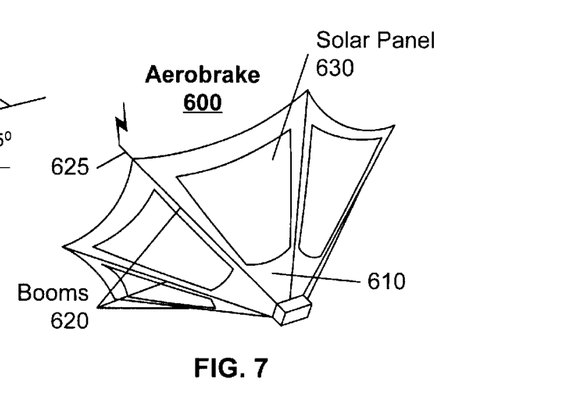

FIGS. 6 and 7 illustrate an example aerobrake device 600 that is configured to provide a preferred amount of reduction in kinetic energy to effect the orbit transfer within a given time period at minimal costs. A number of design choices were made to arrive at this preferred embodiment, and are discussed hereinafter so as to enable the design of alternative configurations, as the situation demands.

A user of the orbit-transfer service of this invention desires the orbit transfer to occur as quickly as possible, so that the intended mission of the payload satellite can be initiated. A rapid deployment from a geosynchronous transfer orbit (GTO) to low-earth orbit (LEO), however, will require a substantial cost, in terms of propellant and/or means for dissipating the heat generated during a rapid aerobrake deceleration. For marketing viability, a limit of 90 days is set as the maximum time from launch to deployment of the payload satellite. A goal of 60 days+/−30 days has been determined to be sufficient for providing for a low cost orbit transfer, and generally acceptable to potential customers of this service.

As noted above, this invention is particularly well suited for small payload satellites, typically under 400 kg. A corresponding orbit transfer vehicle generally weighs less than 200 kg. It is expected that the smallest viable orbit transfer vehicle will be about 70 kg, and will be suitable for payloads up to 50 kg.

The choice of a perigee altitude 113 determines the amount of atmospheric friction that the aerobrake device will encounter as it traverses the earth's atmosphere. At a very high altitude, such as 600 km, very little friction is encountered. As such, to effect the required total reduction in kinetic energy, the aerobrake device must be very large, and/or the number of traversals through the atmosphere at this altitude must be very large. For example, at a nominal perigee altitude of 600 km, a drogue device having an effective area of approximately 15,000 square meters would be required to achieve the reduction in energy required to go from GTO to LEO within 90 days, assuming a nominal payload of under 400 kilograms, and an orbit transfer vehicle of under 200 kilograms. To provide such a large surface area at a feasible weight, extremely thin material would be required. Preferably, to achieve efficient aerobraking, the perigee altitude is less than 175 kilometers.

Conversely, at a very low altitude, such as 90 km, the atmosphere is dense enough to allow for a relatively small drogue surface area. At this altitude, however, substantial heat is generated over the relatively small surface area, requiring the use of a heat shield to protect the orbit transfer vehicle and the payload satellite. Additionally, at this low nominal altitude, the perigee would need to be controlled very well, to avoid relatively minor changes in altitude that could lead to relatively large changes in the amount of heat generated or in the amount of drag produced. Preferably, the minimum altitude is 130 km, to avoid excess heat generation.

In a preferred embodiment, a perigee altitude of 155 km+/−15 km is used. At this altitude, the aerothermal loads are sufficiently low to allow the use of conventional spacecraft materials. The +/−15 km range around the nominal 155 km altitude allows for infrequent perigee adjustment measures, typically in the order of two to four days between perigee adjustment thrusts. This range also serves to minimize risks, by eliminating the criticality of each orbit adjustment maneuver, and provides several days of safety margin. This range also allows the mission controller to adjust the altitude as required to assure that the payload satellite is deployed on schedule, regardless of the variations in atmospheric density. That is, if the density is lower than expected, the perigee is reduced, whereas if the density is higher than expected, the perigee can be raised and/or fewer corrections need be applied.

At this nominal altitude, a surface area of approximately 150 square meters is required to achieve the reduction in energy required to go from GTO to LEO within 90 days, assuming a nominal payload of approximately 400 kilograms, and a transfer vehicle of approximately 200 kilograms. Specifically, an aerobrake with a profile area of 0.25 m$^2$ per kilogram provides a drag coefficient of approximately 1.5 at this altitude.

In a preferred embodiment of this invention, the surface area of the aerobrake is also used to support solar panels (630 in FIG. 7) that provide power to the orbit transfer vehicle. Because of the significant surface area provided by the aerobrake, flexible solar panels can be used. In the current state of the art, flexible solar panels are substantially less efficient per unit area, but also substantially less costly per unit area, than rigid solar panels, thereby allowing for a cost-effective embodiment, given a large enough surface area. The power provided by the solar panels is used to power the navigation and guidance system, the communications system, and other systems on the orbit transfer vehicle. Additionally, the orbit transfer vehicle contains a heating, and optional cooling, system that controls the temperature within the orbit transfer vehicle to within the safe operating conditions of the other systems. Depending upon the particular configuration, these solar panels may also provide power to the payload satellite, to operate select systems, such as a heating system within the satellite, during the orbit transfer period. The orbit transfer vehicle contains energy storage devices, such as batteries, that store energy while the solar panels are exposed to sunlight, and provide power when the solar panels are not exposed to sunlight.

The surface of the aerobrake 600 is preferably a KAPTON material, which is aluminized on both front and rear surfaces. A electrical short is provided between the aluminized surfaces to prevent an electrostatic charge build-up. To minimize oxygen erosion, the aluminized KAPTON panel is painted, preferably with white paint, to minimize thermal effects.

Any of a variety of shapes may be employed to provide the desired aerobrake profile area. In a preferred embodiment, an umbrella shaped aerobrake 600 is used, as illustrated in FIG. 7. The aerobrake panels 610 are angled aft at about 25 degrees, providing a half cone angle, and thereby a nominal attack angle, of 65 degrees. Because the drag coefficient varies by the cube of the sine of the attack angle, the actual area of the aerobrake panel is increased by approximately 35% to provide the aforementioned profile area. This angled orientation also stabilizes the orbit transfer vehicle each time the aerobrake passes through the atmosphere, further reducing the required complexity of the orbit transfer vehicle, and further allowing for relatively infrequent attitude control and adjustment. As the aerobrake passes through increasing atmospheric density, the orbit-transfer vehicle is forced to be oriented in the proper direction. The umbrella is formed by radial booms 620 having aerobrake panels 610 between them.

In a preferred embodiment of this invention, the radial booms 620 of the umbrella are flexible bands that are affixed to the orbit transfer vehicle in the configuration shown in FIG. 6. These flexible spines are wrapped around the orbit transfer vehicle, under tension, for launch. When the tension is released, the bands spring to their de-tensioned position, forming the umbrella. These booms 620 are designed to provide normal, torsional, and bending stiffness per unit mass, while providing a low tangential stiffness to allow spiral packaging.

Alternatively, inflatable booms 620 may be used, wherein the pressure to inflate the booms 620 is provide by the propellant pressure system. In such an embodiment, the inflation of the booms 620 is preferably controlled by the ground station, to provide controlled inflation pulses, to assure a controlled deployment. Also in a preferred embodiment of inflatable booms 620, a UV-sensitive epoxy is used to coat the booms 620, and the booms are allowed to deflate after the epoxy hardens.

Also in a preferred embodiment, one or more of the booms contain an antenna element 625, to facilitate communications to and from the orbit transfer vehicle, via the communications system 335 of FIG. 4. In a preferred embodiment of this invention, the antenna is embedded into the aerobrake material, thereby using the aerobrake as the antenna. This obviates the need for a mechanical structure to mount an independent antenna on the aerobrake.

The foregoing merely illustrates the principles of the invention. It will thus be appreciated that those skilled in the art will be able to devise various arrangements which, although not explicitly described or shown herein, embody the principles of the invention and are thus within its spirit and scope. For example, some or all of the orbit-transfer components can be configured to remain with the payload satellite after the payload satellite is placed in orbit, to further service the satellite. That is, for example, the payload satellite can be configured to use the navigation and guidance system, the communications systems, and so on, as required, thereby eliminating the need to include these items in the design of the payload satellite. These and other system optimizations will be evident to one of ordinary skill in the art in view of this disclosure, and are included in the spirit and scope of the following claims.

We claim:

1. An orbit-transfer vehicle that facilitates the deployment of a payload satellite into a target orbit, comprising
    a guidance and navigation system that is configured to maneuver the orbit-transfer vehicle and the payload satellite from a first orbit to the target orbit, the first orbit having an associated first-orbit-energy that is substantially greater than a target-orbit-energy associated with the target orbit, and
    an aerobrake device that is configured to facilitate a dissipation of energy from the first-orbit-energy to the target-orbit-energy.

2. The orbit-transfer vehicle of claim 1, wherein the aerobrake device further facilitates a stabilization of the orbit-transfer vehicle as the orbit-transfer vehicle is maneuvered to the target orbit.

3. The orbit-transfer vehicle of claim 1, wherein the first orbit corresponds to a launch orbit, and the orbit-transfer vehicle is configured to facilitate:
    an attachment of the payload satellite to the orbit-transfer vehicle, and
    an attachment of the orbit-transfer vehicle to a launch vehicle that is configured to deploy the orbit-transfer vehicle with attached payload satellite to the launch orbit.

4. The orbit-transfer vehicle of claim 1, further including the payload satellite.

5. The orbit-transfer vehicle of claim 1, wherein the guidance and navigation system is further configured to provide a thrust that is sufficient to force the orbit-transfer vehicle from the first orbit into a portion of atmosphere to effect the dissipation of energy by the aerospace device.

6. The orbit-transfer vehicle of claim 5, wherein the guidance and navigation system is further configured to control perigee of the orbit-transfer vehicle via one or more other thrusts that are applied in the vicinity of apogee of the orbit-transfer vehicle.

7. The orbit-transfer vehicle of claim 6, wherein the guidance and navigation system is further configured to effect the control of the perigee of the orbit-transfer vehicle based on commands from a ground station.

8. The orbit-transfer vehicle of claim 6, wherein the guidance and navigation system effects the control of the perigee to an altitude between 100 kilometers and 600 kilometers.

9. The orbit-transfer vehicle of claim 6, wherein the guidance and navigation system effects the control of the perigee to an altitude between 130 kilometers and 175 kilometers.

10. The orbit-transfer vehicle of claim 9, wherein the aerobrake device is configured to provide sufficient stabilization such that the orbit-transfer vehicle is self-orienting as it enters increased atmospheric density.

11. The orbit-transfer vehicle of claim 1, wherein the guidance and navigation system is further configured to apply thrust to the payload satellite so as to force the payload satellite beyond the atmosphere when the payload satellite substantially reaches apogee at an altitude corresponding to the target orbit.

12. The orbit-transfer vehicle of claim 1, wherein
    the guidance and navigation system is further configured to receive commands from a ground station, and
    the commands from the ground station are configured to effect the maneuvering of the orbit-transfer vehicle and the payload satellite from the first orbit to the target orbit over a time duration having a predetermined set of lower and upper bounds.

13. The orbit-transfer vehicle of claim 12, wherein the lower and upper bounds are 30 and 90 days, respectively.

14. The orbit-transfer vehicle of claim 12, wherein the commands from the ground station are dependent upon atmospheric densities encountered by the aerobrake device during the maneuvering of the orbit-transfer vehicle and the payload satellite from the first orbit to the target orbit.

15. The orbit-transfer vehicle of claim 1, wherein the aerobrake device is configured to have an umbrella shape when deployed.

16. The orbit-transfer vehicle of claim 15, wherein the umbrella shape includes a half cone angle that is between 60 and 70 degrees.

17. The orbit-transfer vehicle of claim 15, wherein the aerobrake device includes
    a plurality of radial booms, and
    an aerobrake panel between each pair of radial booms of the plurality of radial booms.

18. The orbit-transfer vehicle of claim 17, wherein each of the plurality of radial booms is inflatable.

19. The orbit-transfer vehicle of claim 18, wherein
    the orbit-transfer vehicle also includes a propellant pressure system, and
    the plurality of radial booms are inflated via the propellant pressure system.

20. The orbit-transfer vehicle of claim 17, wherein the plurality of radial booms are elastic bands that are configured to be:
    wrapped around the orbit-transfer vehicle prior to the deployment of the aerobrake device, and
    released to form the umbrella shape when the aerobrake device is deployed.

21. The orbit-transfer vehicle of claim 1, wherein the aerobrake device provides a drag coefficient between 1.25 and 1.75.

22. The orbit-transfer vehicle of claim 1, wherein the aerobrake device provides a profile area between 0.2 and 0.3 square meters per kilogram of mass of the orbit-transfer vehicle and the payload satellite.

23. The orbit-transfer vehicle of claim 1, wherein the aerobrake device is further configured to contain one or more antenna elements that facilitate communication to the orbit-transfer vehicle.

24. The orbit-transfer vehicle of claim 23, wherein the one or more antenna elements are embedded within materials forming the aerobrake device.

25. The orbit-transfer vehicle of claim 1, wherein the orbit-transfer vehicle is configured to release the payload satellite when the payload satellite is maneuvered to the target orbit.

26. The orbit-transfer vehicle of claim 1, wherein at least a portion of the orbit-transfer vehicle is configured to remain with the payload satellite when the payload satellite is maneuvered to the target orbit.

27. The orbit-transfer vehicle of claim 26, wherein the portion of the orbit-transfer vehicle that is configured to remain with the payload satellite is configured to provide the payload satellite with at least one of:
power,
communications,
navigation and control, and
stabilization.

28. An orbit-transfer vehicle that facilitates the deployment of a payload satellite into a target orbit, comprising an guidance and navigation system that is configured to maneuver the orbit-transfer vehicle and the payload satellite from a first orbit to the target orbit, the first orbit having an associated first-orbit-energy that is substantially greater than a target-orbit-energy associated with the target orbit, and an aerobrake device that is configured to facilitate a dissipation of energy from the first-orbit-energy to the target-orbit-energy, wherein
the aerobrake device includes a solar panel that is configured to provide power to the orbit-transfer vehicle.

29. The orbit-transfer vehicle of claim 28, wherein the orbit-transfer vehicle is configured to provide a portion of the power to the payload satellite.

30. The orbit-transfer vehicle of claim 28, wherein the solar panel is provided on a flexible substrate.

31. The orbit-transfer vehicle of claim 28, further including a heating system that is configured to provide heat to components of the orbit-transfer vehicle.

32. The orbit-transfer vehicle of claim 28, wherein the orbit-transfer vehicle is configured to release the payload satellite when the payload satellite is maneuvered to the target orbit.

33. The orbit-transfer vehicle of claim 28, wherein at least a portion of the orbit-transfer vehicle is configured to remain with the payload satellite when the payload satellite is maneuvered to the target orbit.

34. The orbit-transfer vehicle of claim 33, wherein the portion of the orbit-transfer vehicle that is configured to remain with the payload satellite is configured to provide the payload satellite with at least one of:
power,
communications,
navigation and control, and
stabilization.

* * * * *

UNITED STATES PATENT AND TRADEMARK OFFICE
CERTIFICATE OF CORRECTION

| | | |
|---|---|---|
| PATENT NO. | : 6,550,720 B2 | Page 1 of 1 |
| APPLICATION NO. | : 09/925207 | |
| DATED | : April 22, 2003 | |
| INVENTOR(S) | : Fleeter et al. | |

It is certified that error appears in the above-identified patent and that said Letters Patent is hereby corrected as shown below:

Col. 1, line 5 ADD the following statement to the referenced patent:
This invention was made with U.S. Government support under Contract No. F29601-02-C-0008 awarded by the U.S. Air Force. The U.S. Government has certain rights in the invention.

Signed and Sealed this
First Day of November, 2011

David J. Kappos
*Director of the United States Patent and Trademark Office*